Feb. 9, 1937.    A. ROSA    2,070,493
GLASS MOLD
Filed April 17, 1935
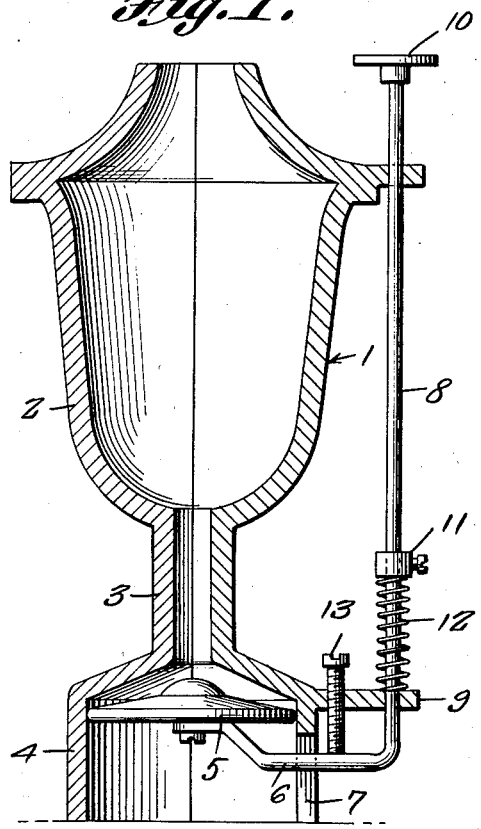
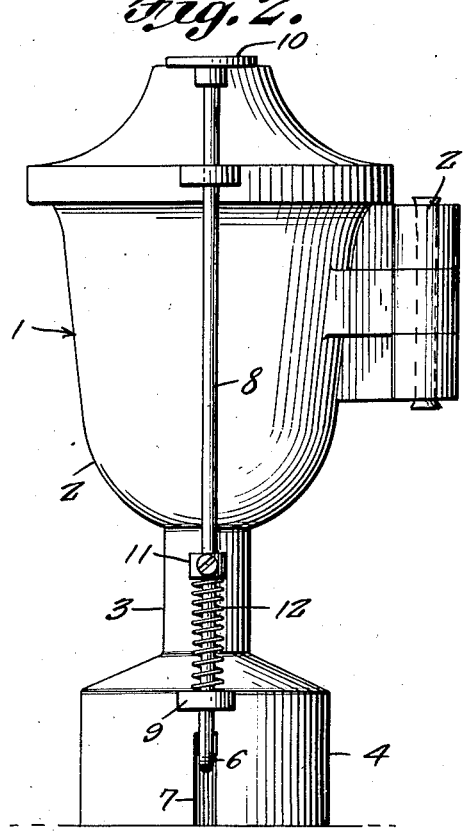
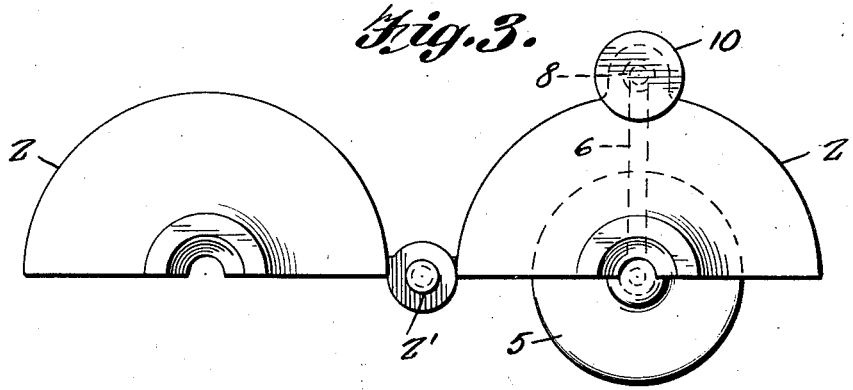
Anthony Rosa,
INVENTOR
BY Victor J. Evans & Co.
ATTORNEY Patented Feb. 9, 1937

2,070,493

UNITED STATES PATENT OFFICE 2,070,493

GLASS MOLD

Anthony Rosa, Morgantown, W. Va.

Application April 17, 1935, Serial No. 16,910

1 Claim. (Cl. 49—69)

This invention relates to glass molds for the blowing of pedestal-type tumblers or goblets and similar glassware, and has for the primary object the provision of a device of this character which permits the pedestal, stem and body of the tumbler or goblet to be formed in the mold by a single blowing operation, obviating the customary practice of forming and joining the pedestal to the stem after the formation of the latter and the body of the tumbler or goblet.

With these and other objects in view, this invention consists in certain novel features of construction, combination and arrangement of parts to be hereinafter more fully described and claimed.

For a complete understanding of my invention, reference is to be had to the following description and accompanying drawing, in which—

Figure 1 is a vertical sectional view illustrating a mold constructed in accordance with my invention.

Figure 2 is a side elevation illustrating the same.

Figure 3 is a top plan view illustrating the mold in an open position.

Referring in detail to the drawing, the numeral 1 indicates a sectional mold wherein the sections are connected by a hinge 2' permitting the sections to be readily opened or closed when desired. The mold 1 includes a body portion 2, a shank 3 and a base 4. The body portion 2 is of a design or shape to form the body of a tumbler or goblet while the shank 3 is of a shape to form the stem of a goblet or tumbler, while the base 4 is of a shape and construction for the formation of the pedestal of a tumbler or goblet. The body portion 2 is in communication with the base 4 by the hollow shank 3. Slidably mounted in the base 4 is a plunger 5 carried by an arm 6 operating through a slot 7 formed in a wall of the base and is formed integrally with a rod 8. The rod 8 is slidably mounted in apertured ears 9, one of which is integral with the body portion 2 and the other integral with the base 4. The free end of the rod 9 carries the finger piece 10 and mounted upon the rod 8 is an adjustable collar 11 forming a seat for one end of a coil spring 12. The spring 12 surrounds the rod and has one end in engagement with one of the ears. The spring acts to urge the plunger in its uppermost position within the base 4. The upward movement of the plunger may be varied by a set screw 13 carried by one of the ears 9 and engaging the arm 6. The tension of the spring 12 may be varied by adjusting the position of the collar 11 on the rod 8.

The operator first gathers molten glass on the end of a conventional type of blow pipe and rolls or marbles the molten glass as customary in glass blowing. The end of the blow pipe carrying the molten glass is positioned in the body portion 2 of the mold adjacent to the shank 3. The sections of the mold are brought together with the blow pipe extending from the mold. The operator presses the finger piece 10 to position the plunger 5 a desired distance downwardly in the base 4 of the mold. The operator then blows through the tube forcing the glass through the shank 3 into the space defined by the walls of the base 4 and the plunger 5. This space and also the shank 3 is filled with glass and the operator releases the pressure on the finger piece 10 permitting the spring 12 to act to urge the plunger 5 upwardly compressing the glass in the base 4 into a desired shape for forming a pedestal. The glass in the shank 3 also assumes proper shape to form a stem of the glassware. The blowing operation is continued so that the glass is forced against the walls of the body portion 2 of the mold, thereby forming the body of the glassware, stem and base or pedestal in a single operation. After the completion of the glassware as before described the blow pipe is then detached in the usual way from the glass. Thus it will be seen that by a single blowing operation of the glass, the pedestal, stem and body of the glassware is formed at one time obviating the customary practice of forming and joining the pedestal to the stem of the glassware in a separate operation from the forming of the stem and the body of the glassware. The present mold permits the forming of glassware more efficiently, in less time and at a lower cost.

Having described the invention, I claim:

A portable glass mold for the blowing of glassware comprising a sectional form including a body portion, a shank and a base in which glass is blown to form the glass into a body, stem and pedestal of the glassware in a single blowing operation, a hinge connecting the sections of the form, a plunger slidable in said base and manually controlled to spread the blown glass into pedestal formation integral with the stem of the glassware, said base having a slot, an arm connected to the plunger and operable through the slot of the base, a rod integral with the arm and slidably connected with the form, a spring acting on said rod to urge the plunger in the base in the direction of the shank, and a set screw carried by the base for varying the movement of the plunger in the direction of said shank.

ANTHONY ROSA.